(12) United States Patent
Warner et al.

(10) Patent No.: US 9,757,665 B2
(45) Date of Patent: Sep. 12, 2017

(54) HYDROSTATIC OIL TREATMENT SYSTEM

(71) Applicant: Black Suede Hydro Carbon Processing Ltd., Kipling (CA)

(72) Inventors: Michael Warner, Kipling (CA); Dean Andres, Kipling (CA)

(73) Assignee: Black Suede Hydro Carbon Processing, Ltd., Kipling, SK (CA)

( * ) Notice: Subject to any disclaimer, the term of this patent is extended or adjusted under 35 U.S.C. 154(b) by 268 days.

(21) Appl. No.: 14/753,567

(22) Filed: Jun. 29, 2015

(65) Prior Publication Data

US 2015/0375140 A1    Dec. 31, 2015

Related U.S. Application Data

(60) Provisional application No. 62/018,082, filed on Jun. 27, 2014.

(51) Int. Cl.
| | | |
|---|---|---|
| *B01D 19/00* | (2006.01) | |
| *B01D 17/02* | (2006.01) | |
| *C02F 1/40* | (2006.01) | |
| *C10G 33/06* | (2006.01) | |
| *B01D 17/12* | (2006.01) | |
| *C02F 101/32* | (2006.01) | |

(52) U.S. Cl.
CPC ......... *B01D 17/0214* (2013.01); *B01D 17/12* (2013.01); *B01D 19/0063* (2013.01); *C02F 1/40* (2013.01); *C10G 33/06* (2013.01); *C02F 2101/32* (2013.01)

(58) Field of Classification Search
CPC ............................ B01D 19/00; B01D 19/0063
USPC ............. 95/241, 253; 96/155, 156, 157, 158
See application file for complete search history.

(56) References Cited

U.S. PATENT DOCUMENTS

| | | |
|---|---|---|
| 2,182,145 A | 12/1939 | Eddy |
| 5,707,510 A | 1/1998 | Berry |
| 2016/0008742 A1* | 1/2016 | Adler ................. B01D 19/0063 96/157 |

* cited by examiner

*Primary Examiner* — Robert A Hopkins
(74) *Attorney, Agent, or Firm* — Ryan W. Depuis; Klye R. Satterthicis; Ade & Company Inc.

(57) ABSTRACT

A hydrocarbon emulsion treatment system includes a treatment tank having a gas vent for operating the treatment tank near atmospheric pressure. The treatment tank separates water and oil in the emulsion for discharge to separate water and oil tanks respectively. According to a preferred embodiment, the treatment tank and the oil tank are supported on a common frame including an integral secondary containment structure providing secondary containment to both the treatment tank and the oil tank. The treatment tank is supported at greater elevation than the oil tank to allow the flow of oil from the treatment tank to the oil tank primarily under force of gravity.

18 Claims, 12 Drawing Sheets

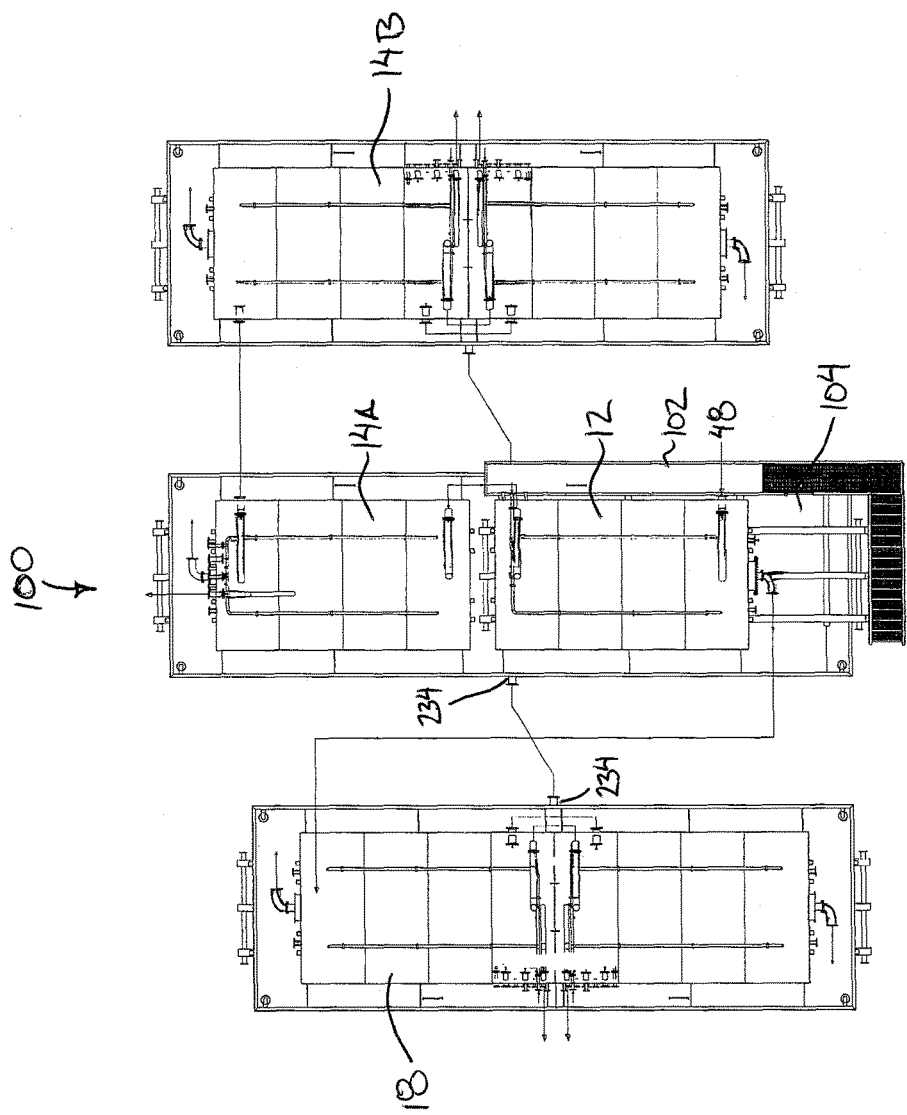

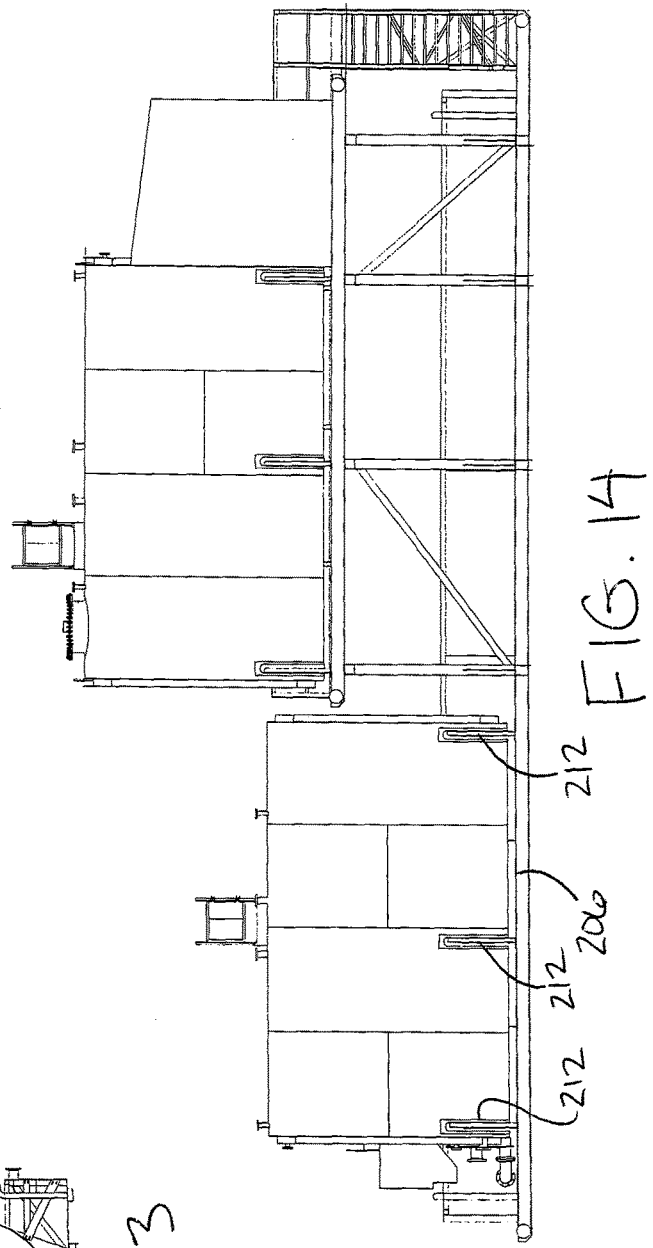
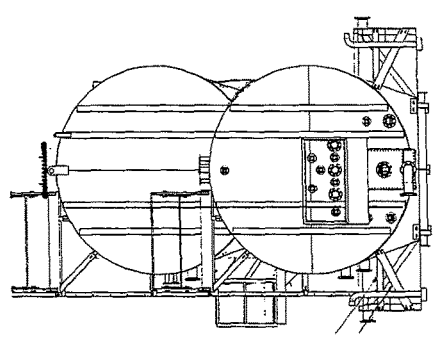

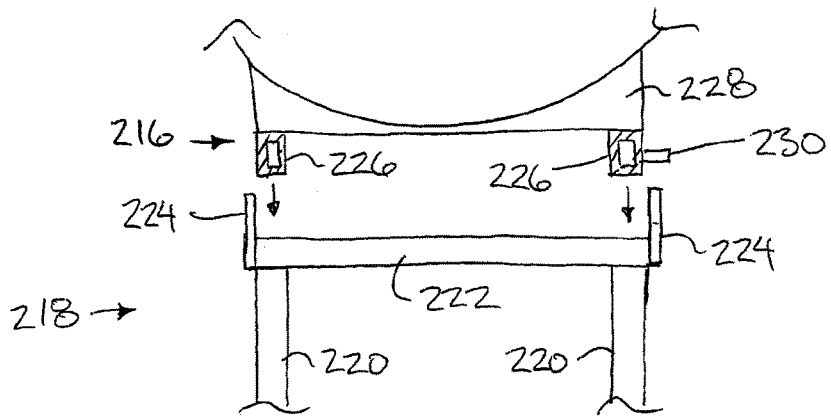
FIG. 15
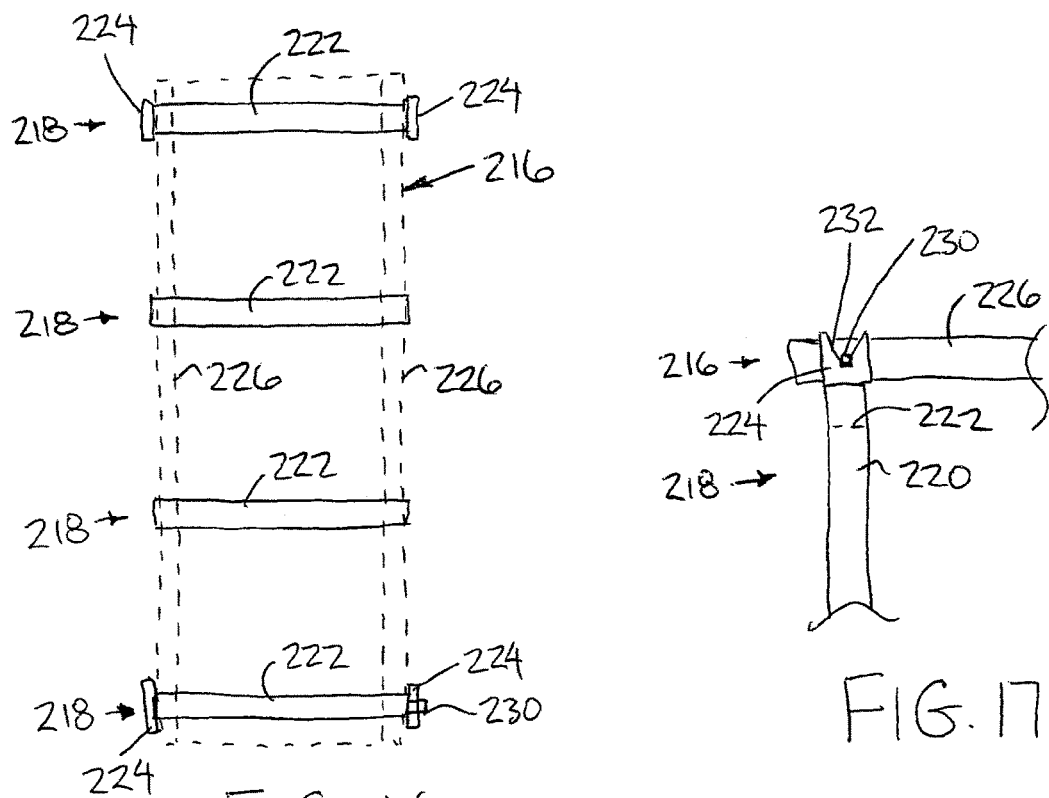
FIG. 16
FIG. 17

HYDROSTATIC OIL TREATMENT SYSTEM

This application claims the benefit under 35 U.S.C. 119(e) of U.S. provisional application Ser. No. 62/018,082, filed Jun. 27, 2014.

FIELD OF THE INVENTION

The present invention relates to a system and a method of use of the system for treating a produced hydrocarbon emulsion, for example produced light oil, to separate oil, water, and gas components in a treatment chamber which is maintained substantially at or near atmospheric pressure.

BACKGROUND

Hydrocarbons are typically produced from the ground in the form of an emulsion of various fractions of oil, water and gases. Typically it is desirable to perform some initial treatment of the produced fluids to remove the bulk of the water and gas content prior to delivery to a treatment plant. The produced fluids can be initially treated at the production site, or alternatively transferred to an intermediate site for initial treatment to remove the bulk of the water and gas content.

Initial treatment of light and heavy oil is conventionally accomplished using a pressurized treatment vessel. Examples of pressurized treatment vessels are described in U.S. Pat. No. 5,707,510 by Berry and U.S. Pat. No. 2,182,145 by Eddy. Although effective, such pressure vessels require boiler certification, PSV's, pop tanks, costly turnarounds for setup and maintenance, and inspections to be performed.

SUMMARY OF THE INVENTION

According to one aspect of the invention there is provided a treatment system for treating a produced hydrocarbon emulsion, the treatment system comprising:
  i) a treatment tank comprising:
  a treatment chamber;
  a production inlet in communication with the treatment chamber so as to be arranged to introduce the produced hydrocarbon emulsion into the treatment chamber;
  a water outlet in communication with the treatment chamber in proximity to a bottom end of the treatment chamber so as to be arranged to discharge water from the bottom end of the treatment chamber therethrough;
  a gas vent in communication with the treatment chamber in proximity to a top end of the treatment chamber so as to be arranged to vent gases from the treatment chamber therethrough and maintain the treatment chamber near atmospheric pressure; and
  an oil outlet in communication with the treatment chamber in proximity to the top end of the treatment chamber, at a location spaced below the gas vent so as to define a gas section at the top end of the treatment chamber between the gas vent and the oil outlet, the oil outlet being arranged to discharge oil from treatment chamber therethrough;
  ii) a water tank in communication with the water outlet of the treatment tank so as to be arranged to receive the water discharged from the treatment chamber; and
  iii) an oil tank in communication with the oil outlet so as to be arranged to receive the oil discharged from the treatment chamber.

According to a second aspect of the present invention there is provided a method of treating a produced hydrocarbon emulsion, the method comprising:
  providing a treatment tank, a water tank and an oil tank;
  introducing the produced hydrocarbon emulsion into a treatment chamber of the treatment tank so as to permit the produced hydrocarbon emulsion to separate into an upper gas section, an intermediate oil section, and a lower water section in the treatment chamber;
  discharging oil from the intermediate oil section of the treatment chamber to the oil tank;
  discharging water from the lower water section of the treatment chamber to the water tank; and
  discharging gas from the upper gas section of the treatment chamber so as to maintain pressure in the treatment chamber near atmospheric pressure.

The method of treating oil preferably includes: i) returning oil in the water tank to the treatment chamber; ii) returning water in the oil tank to the treatment chamber; iii) heating the water being returned to the treatment chamber from the oil tank; and iv) discharging the oil from the intermediate oil section of the treatment chamber to the oil tank solely under force of gravity.

The tanks are preferably arranged as modular units which can be readily transported to and setup at a production site. The operation of the treatment tank substantially at atmospheric pressure has been found to be particularly effective for light oil treatment.

More particularly, the treatment system and method according to the present invention has found to be advantageous over prior art arrangements in the following manners: no pressure vessels needed, eliminating boiler certification, PSV's, pop tanks, costly turnarounds, and inspections; less on site equipment with high volume capacity; low engineering costs using a modular design; lower on site labour costs; faster on production times; easily set up for water flooding; much lower capital costs; operator friendly and simpler alarms and ESD's, low pressure system with low flowline pressures, reducing or eliminating need for casing gas pumps; no ground disturbance other than compacted gravel pad; smaller site requirements; capable of processing dead emulsion pumped from trucks or flowline; no long centre lines required; all equipment contained with secondary containment; easy clean out hopper bottom design; and remote site installation ability.

According to another aspect of the present invention there is provided a treatment system for use with a water tank and an oil tank for treating a produced hydrocarbon emulsion, the treatment system comprising:
  a treatment tank comprising:
  a treatment chamber;
  a production inlet in communication with the treatment chamber so as to be arranged to introduce the produced hydrocarbon emulsion into the treatment chamber;
  a water outlet in communication with the treatment chamber in proximity to a bottom end of the treatment chamber so as to be arranged to discharge water from the bottom end of the treatment chamber therethrough;
  a gas vent in communication with the treatment chamber in proximity to a top end of the treatment chamber so as to be arranged to vent gases from the treatment chamber therethrough and maintain the treatment chamber near atmospheric pressure; and
  an oil outlet in communication with the treatment chamber in proximity to the top end of the treatment chamber, at a location spaced below the gas vent so as to define a gas section at the top end of the treatment chamber between the gas vent and the oil outlet, the oil outlet being arranged to discharge oil from treatment chamber therethrough;

the water outlet of the treatment tank being arranged to communicate with the water tank such that the water tank is arranged to receive the water discharged from the treatment chamber; and the oil outlet of the treatment tank being arranged to communicate with the oil tank such that the oil tank is arranged to receive the oil discharged from the treatment chamber.

Preferably the treatment tank is situated at a greater elevation than the water tank and the oil tank.

Preferably the oil outlet of the treatment tank communicates with the oil tank through an open passageway so as to be arranged to communicate oil therethrough by gravity discharge.

The system may further comprise a control valve connected in series with the water outlet of the treatment tank and a sensing apparatus arranged to sense upward deviation of an interface between an oil section and a water section in the treatment chamber from a prescribed operating level, in which the control valve is operable to only permit discharging of the water through the water outlet responsive to said upward deviation of the interface above the prescribed operating level.

Preferably the production inlet communicates with the treatment chamber at a location spaced below said prescribed operating level of the interface between the oil section and the water section.

The treatment tank may further include a flow splitter in communication with the production inlet which is arranged to direct the produced hydrocarbon emulsion into the treatment chamber in more than one direction.

The production inlet may include an upward component arranged to direct the produced hydrocarbon emulsion into the treatment chamber in an upward direction, in which the system further comprises a deflector spanning across said upward component at a location spaced above the upward component so as to be arranged to redirect the produced hydrocarbon emulsion into the treatment chamber in a plurality of different lateral directions.

The system may further comprise: i) a return line in communication with the water tank and the treatment chamber of the treatment tank so as to be arranged to return oil in the water tank to the treatment chamber; and ii) a return pump in series with the return line so as to be arranged to pump the oil returned to the treatment chamber. The return pump may be arranged to direct the returned oil into the treatment chamber through the production inlet. The return line may communicate with an interior of the water tank using an inlet tube supported at an open end by a float member arranged to float above a water layer in the water tank.

The system may further comprise: i) a return line in communication with the oil tank and the treatment chamber of the treatment tank so as to be arranged to return water in the oil tank to the treatment chamber; and ii) a return pump in series with the return line so as to be arranged to pump the water returned to the treatment chamber. The return pump may be arranged to direct the returned water into the treatment chamber through the production inlet.

Preferably a heater is arranged to heat the return line so as to be arranged to return heated fluid to the treatment tank.

The treatment tank may further comprise a bottom wall which tapers downwardly and inwardly from a peripheral wall of the treatment tank to a bottom discharge opening through which sludge is arranged to be discharged so as to define a hopper section at a bottom end of the treatment tank.

A plurality of clean out nozzles may be supported in the hopper section at the bottom end of the treatment tank.

The water tank may comprise a horizontally oriented tank including a secondary containment apparatus integrally supported therewith on a common readily transportable platform.

The oil tank may comprise a horizontally oriented tank including a secondary containment apparatus integrally supported therewith on a common readily transportable platform.

The treatment tank may comprise a modular assembly of a vertically oriented tank and a secondary containment apparatus which is integrally supported on a readily transportable portable platform.

A heat tube flange may be supported on a side wall of the treatment tank so as to be arranged to receive a heater in the treatment chamber through the heat tube flange for heating an oil section of the treatment chamber.

Preferably the treatment tank, the oil tank, and the water tank are each horizontally elongated.

The treatment tank and the oil tank may be supported on a common frame including an integral secondary containment structure supported on the common frame below the treatment tank and the oil tank.

The treatment tank is preferably supported on the common frame at a greater elevation than the oil tank.

The secondary containment may further include an overflow port communicating through a perimeter wall of the secondary containment structure in proximity to a top end of the secondary containment structure in which a pipe connecting flange supported on the overflow port is arranged for connection to the overflow port of an adjacent containment structure of identical configuration.

The treatment tank is preferably supported spaced above an upper boundary of the secondary containment structure.

The common frame preferably integrally supports the secondary containment structure, the oil tank and a support frame thereon, in which the support frame defines a cradle structure supporting the treatment tank therein such that the treatment tank is readily separable from the support frame.

The system may further comprise: i) an enclosure supported on the common frame so as to surround the water outlet; ii) an oil return pump received within the enclosure and operably connected to return oil from the water tank to the treatment chamber; and iii) a water return pump received within the enclosure and operably connected to return water from the oil tank to the treatment chamber.

The system may be provided in combination with a gas separator connected in series with the production inlet of the treatment tank having a gas outlet configured to operate the gas separate substantially at atmospheric pressure.

The produced hydrocarbon emulsion preferably comprises light oil.

Various embodiments of the invention will now be described in conjunction with the accompanying drawings in which:

BRIEF DESCRIPTION OF THE DRAWINGS

FIG. 9 is a more detailed top plan view of the treatment system according to the second embodiment of FIG. 4;

FIG. 13 is a sectional view along the line 13-13 of FIG. 10;

FIG. 14 is a sectional view along the line 14-14 of FIG. 12;

FIG. 15 is an end view of the treatment tank shown being lowered onto the support frame of the common frame according to FIG. 10;

FIG. 16 is a schematic top plan view of the treatment tank shown in broken line relative to the support frame of the common frame according to FIG. 10; and FIG. 17 is a side view of the alignment pin for aligning the treatment tank relative to the support frame.

In the drawings like characters of reference indicate corresponding parts in the different figures.

DETAILED DESCRIPTION

Figure 1:
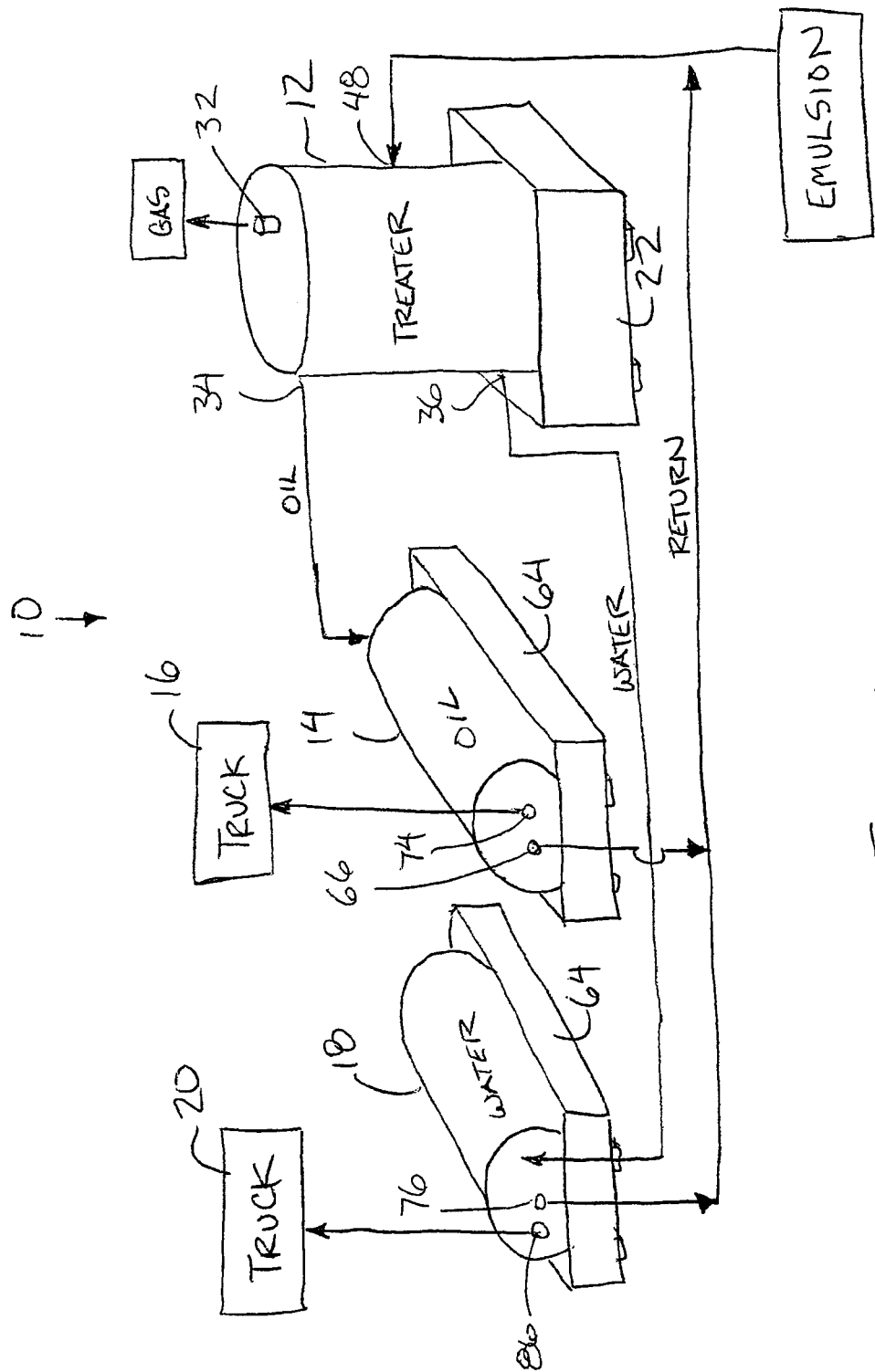
FIG. 1 is a perspective view of the treatment system according to a first embodiment.

Referring to the accompanying figures there is illustrated an oil treatment system generally indicated by reference numeral 10. The system 10 is particularly suited for ready transport and set up to a production site or a temporary storage site for initial treatment of a produced hydrocarbon emulsion prior to transport to a subsequent fractioning processing plant.

Figure 2:
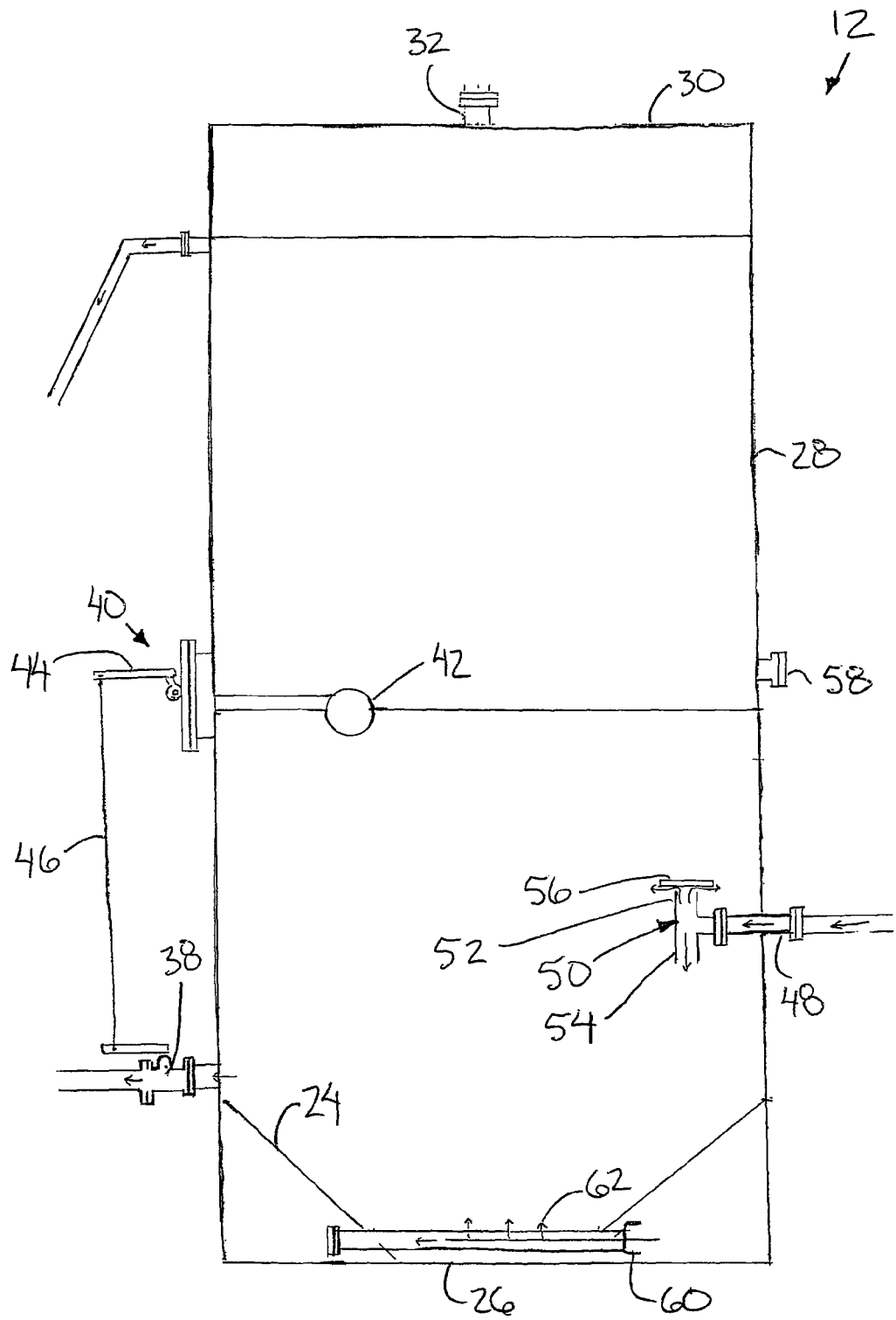
FIG. 2 is a sectional view of the treatment tank according to the first embodiment of the treatment system of FIG. 1.
Figure 3:
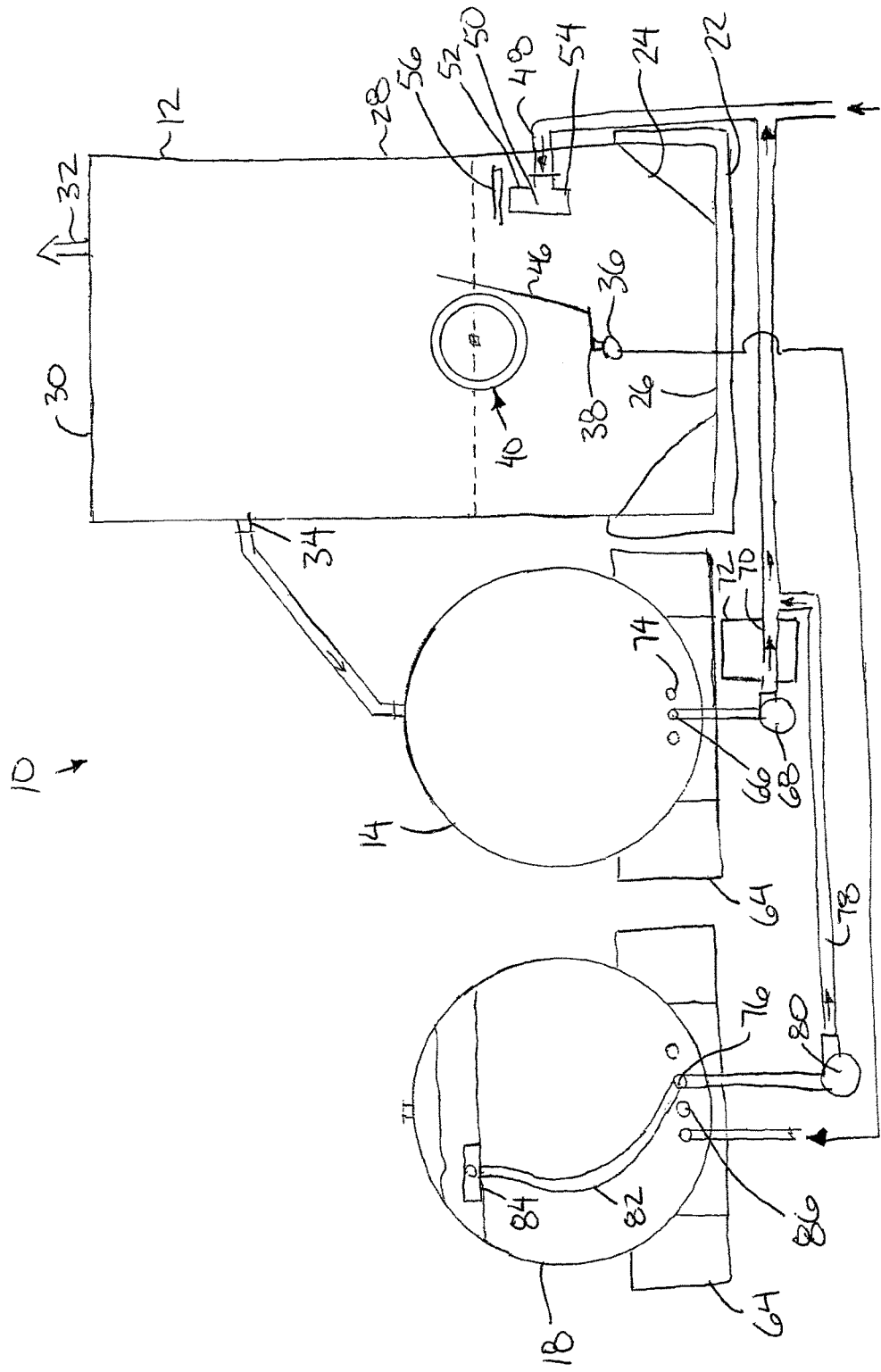
FIG. 3 is a schematic representation of the operation of the treatment system according to the first embodiment of FIG. 1.
Figure 4:
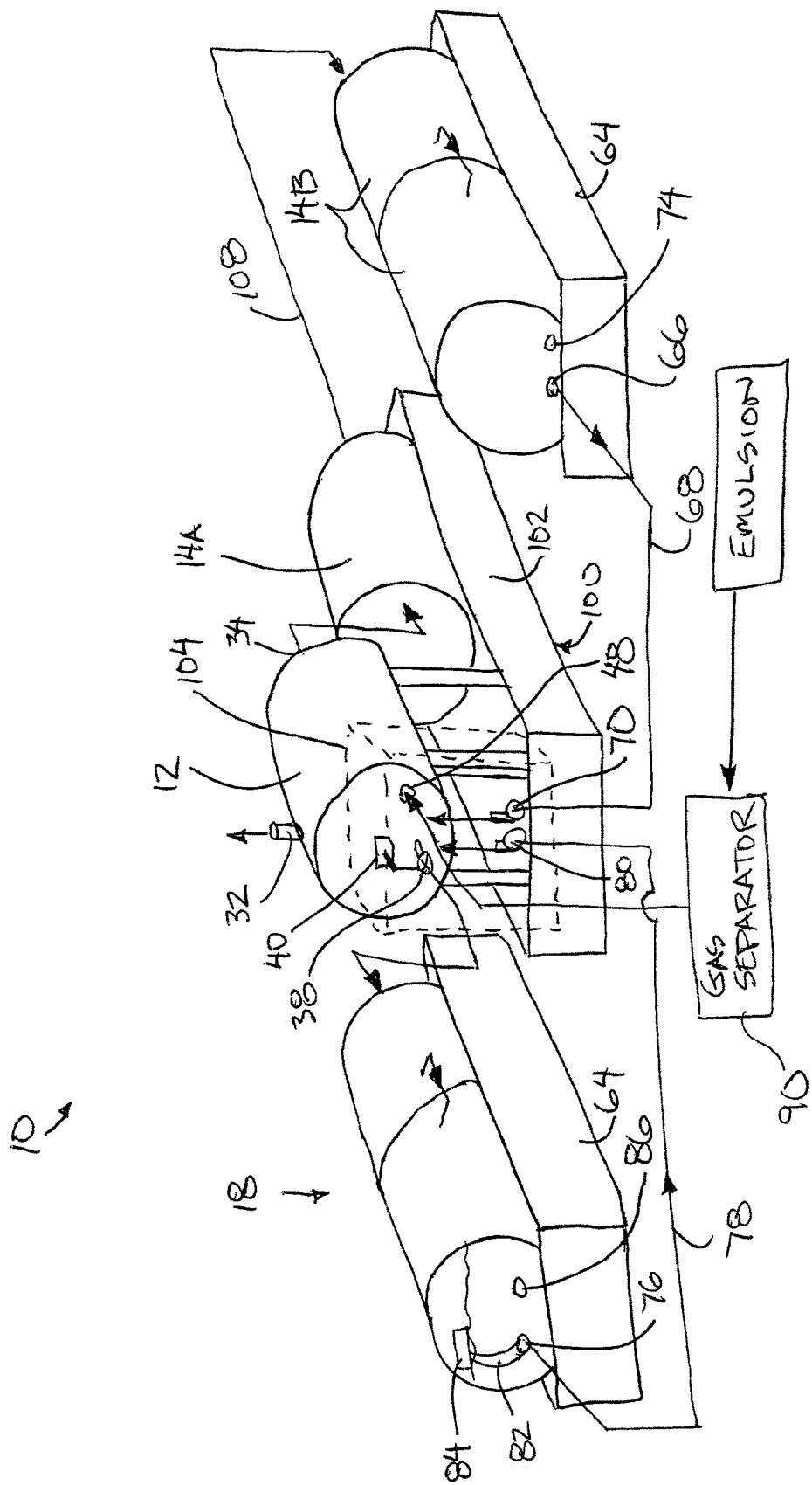
FIG. 4 is a perspective view of the treatment system according to a second embodiment.
Figure 5:
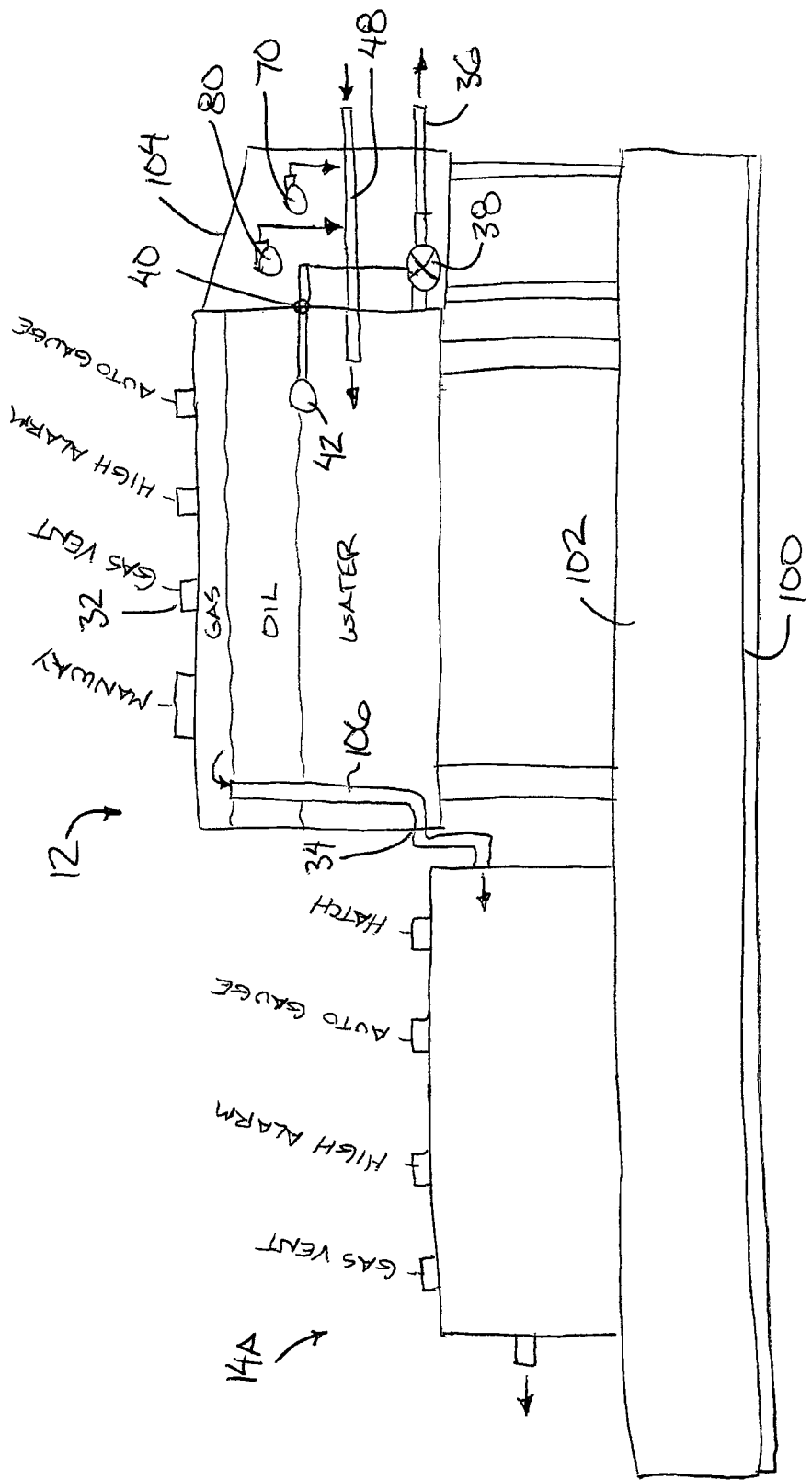
FIG. 5 is a side elevational view of the treatment tank according to the second embodiment of the treatment system of FIG. 4.
Figure 6:
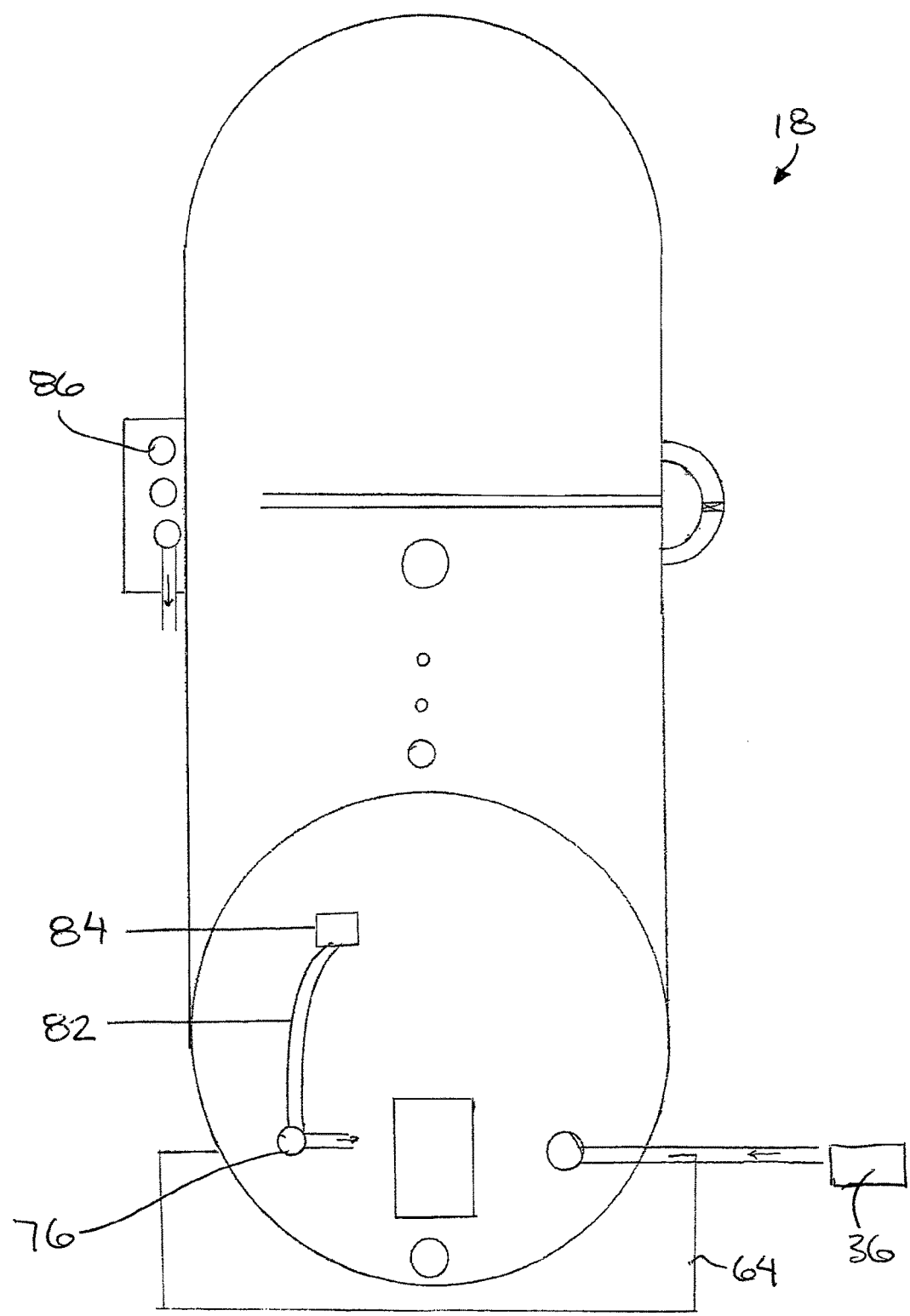
FIG. 6 is a perspective view of the water tank according to the second embodiment of the treatment system of FIG. 4.
Figure 7:
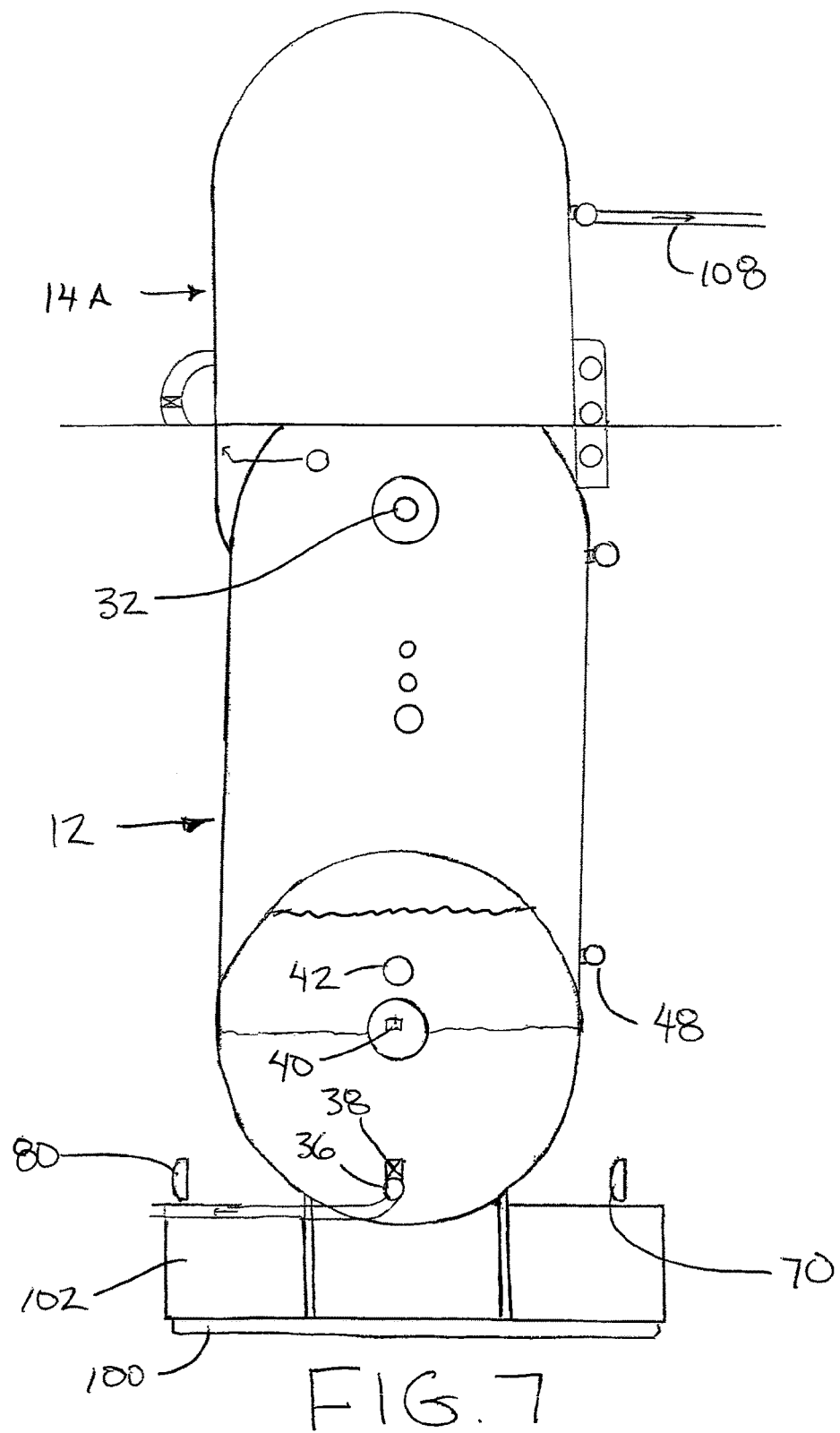
FIG. 7 is a perspective view of the treatment tank and the first oil tank according to the second embodiment of the treatment system of FIG. 4.
Figure 8:
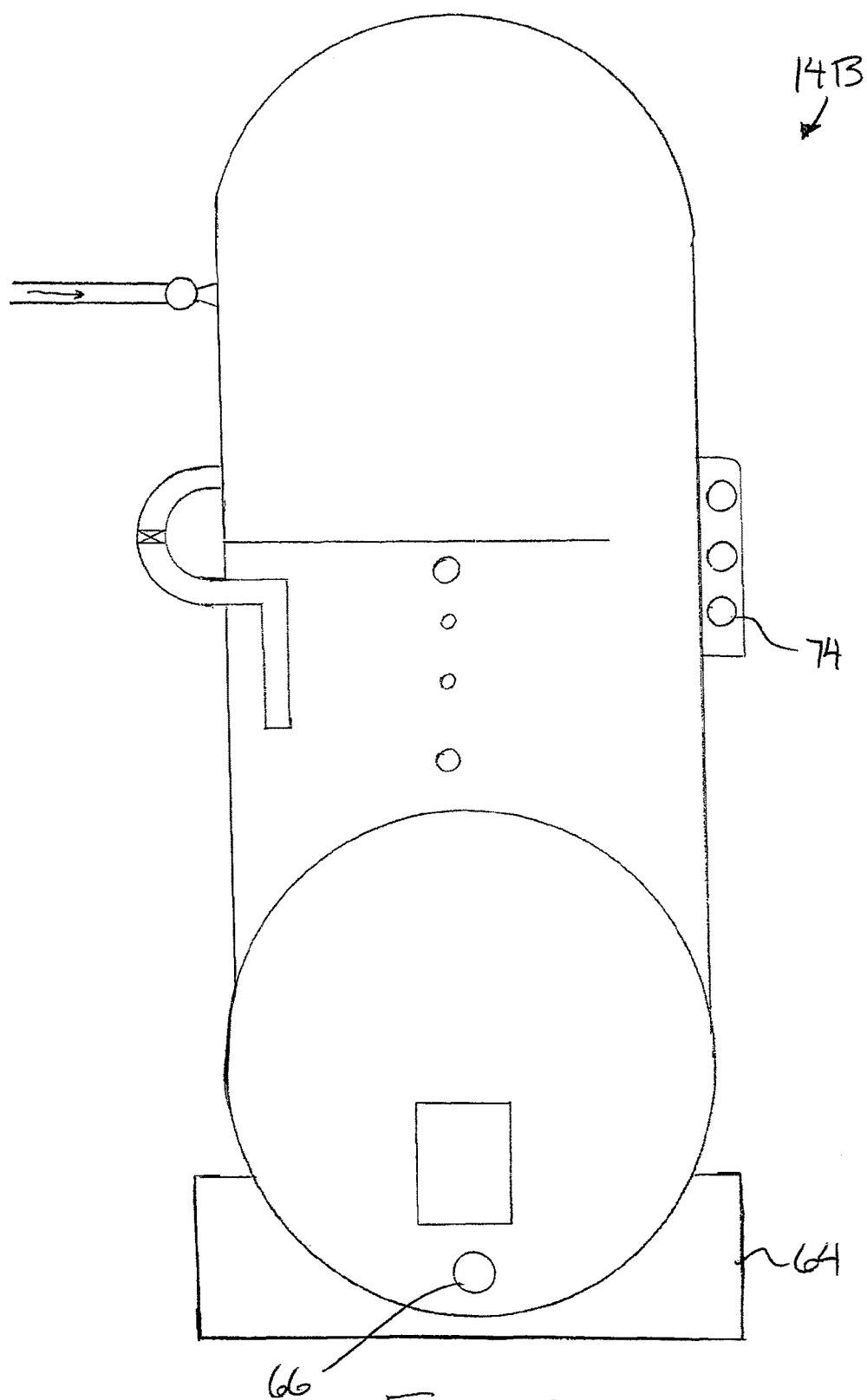
FIG. 8 is a perspective view of the second oil tank according to the second embodiment of the treatment system of FIG. 4.
Figure 12:
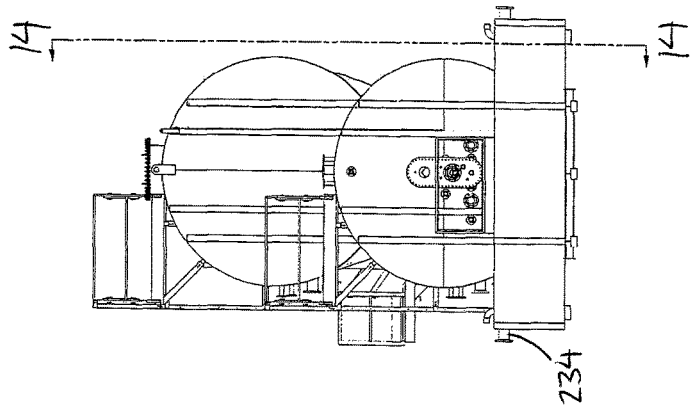
FIG. 12 is an end elevational view of the common frame according to FIG. 10.
Figure 10:
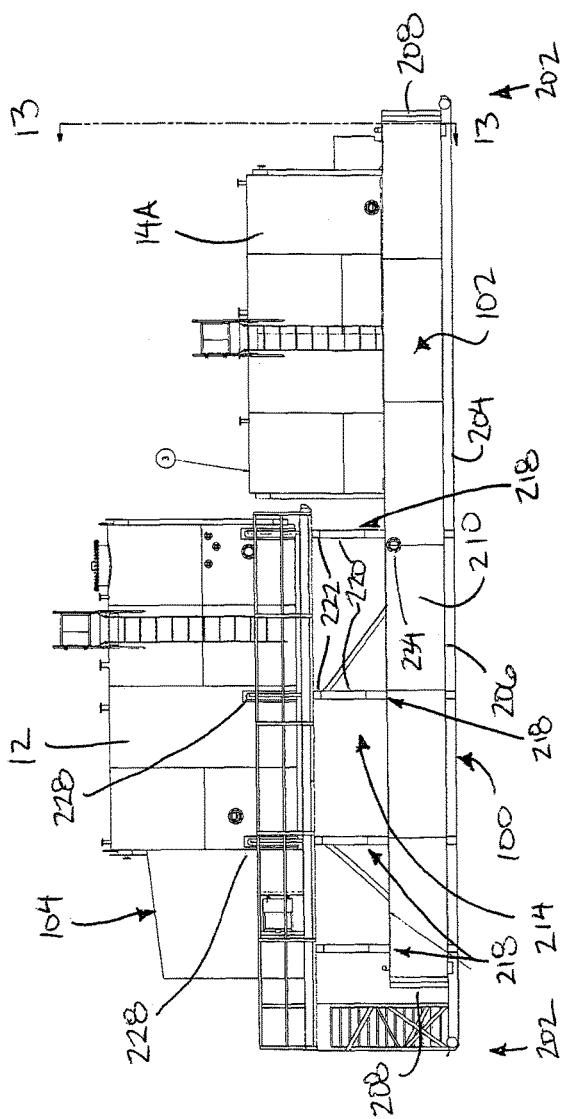
FIG. 10 is a more detailed side view of the common frame supporting the treatment tank, the oil tank and the integral secondary containment thereon according to the second embodiment of FIG. 4.
Figure 11:
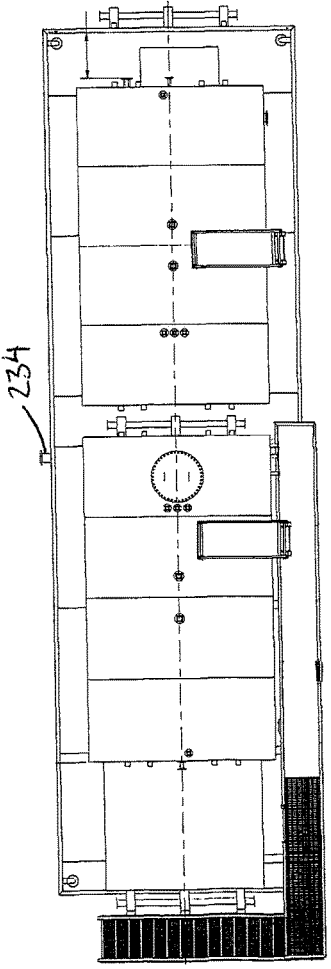
FIG. 11 is a top plan view of the common frame according to FIG. 10.

Although various embodiments are shown in the accompany figures, the features of the first embodiment of FIGS. 1 through 3 will first be described.

As generally represented in FIG. 1, the system includes a treatment tank 12 which receives the produced emulsion therein. Oil is transferred from the treatment tank 12 to a separate oil tank 14 for subsequent discharge to a transport truck 16 as required. Oil is also separated from the emulsion in the treatment tank for being transferred to a separate water tank 18. Collected water in the water tank can similarly be discharged to a transport tanker truck 20.

The treatment tank 12 is a vertically oriented tank so as to be vertically elongated. The tank includes a secondary containment 22 having a platform skid base with integral containment walls about a perimeter thereof such that the skid base and integral containment walls are suitably sized to form a secondary containment to the vertical tank. The secondary containment is also readily transportable, for example using a winch truck, for delivery to a site as a single unit. The treatment tank 12 can be separately transported and assembled with the secondary containment 22 on site.

The tank 12 includes a hopper bottom formed by a conically shaped perimeter wall 24 which tapers downwardly and inwardly from the perimeter of the tank to a central bottom wall 26 at the bottom end of the tank. The conical perimeter wall 24 tapers downwardly and inwardly about the full perimeter of the bottom wall 26.

The tank 12 further includes perimeter side walls 28 which extend vertically upward from the conical perimeter wall 24 to surround the full perimeter of the full tank and span the full height of the tank between the hopper bottom and a top wall 30 enclosing the top end of the tank.

A gas vent 32 communicates to the top wall 30 in communication with the internal treatment chamber within the treatment tank defined by the surrounding walls of the tank. The gas vent ensures that any gas collected at the top of the tank is vented externally of the treatment tank so as to maintain pressure in the tank substantially at or near atmospheric pressure. The gas vent 32 may communicate to suitable gas capturing equipment for a subsequent treatment or combustion of the gases as may be desired.

The treatment tank further includes an oil outlet 34 in the form of a pipe flange communicating through the perimeter side wall of the tank in proximity to the top end of the tank but spaced below the gas vent at the top wall. The oil outlet defines a gas section within the treatment chamber which occupies the area of the tank spanning vertically between the oil outlet 34 and the top wall of the tank. The oil outlet 34 is coupled to an open pipe which communicates to the oil tank which is lower in elevation than the oil outlet such that oil collected at the top of the treatment tank can be gravity fed through the openly communicating piping connected from the treatment tank to the oil tank.

The treatment tank further includes a water outlet 36 similarly provided in the form of a pipe flange communicating through the side wall of the treatment tank. The water outlet is located in proximity to the bottom end of the treatment tank, immediately above the hopper bottom. The water outlet communicates with piping which extends between the treatment tank and water tank such that water collected at the bottom of the treatment tank can be discharged through the water outlet to the water tank.

A control valve 38 is coupled in series with the piping communicating between the water outlet 36 and the water tank to selectively shut off flow through the water outlet when the control valve is closed. When the valve is opened, the flow through the water piping between the water outlet of the treatment tank and the water tank is induced solely by the head pressure of fluid within the treatment tank due to the oil outlet of the treatment tank being spaced well above the elevation of the water tank such that the fluid level is maintained in the treatment tank sufficiently above the elevation of the water tank.

The control valve 38 is operated automatically by a sensing apparatus 40 also supported on the treatment tank. The sensing apparatus is a mechanical linkage which includes a float member 42 supported internally within the treatment chamber at an intermediate height which is approximately or nearly centered between the oil and water outlets of the treatment tanks. The float member 42 is arranged to be lighter than water but denser than oil such that the float member is buoyantly maintained at an oil and water interface within the treatment chamber of the treatment tank 12. The sensing apparatus and control valve are intended to operate to maintain the interface between an oil section thereabove and a water section thereabelow. substantially at a prescribed level which is nearly centered between the oil and water outlets. More particularly, an oil section is defined which extends between the prescribed level of the sensing apparatus 40 and the oil outlet thereabove. Similarly the water section is defined as the area inside the treatment tank spanning vertically between the prescribed level of the sensing apparatus 40 and the bottom end of the tank.

When the water level in the treatment tank rises above the prescribed level, the float member 42 buoyantly deflects upwardly within the treatment chamber. The float member is coupled to a lever which communicates through the side wall of the tank such that an external end of the lever 44 is coupled by a link member 46 to the actuation lever of the control valve 38. The buoyant upward deflection of the float member 42 thus acts in a direction to cause the mechanical linkage of the sensing apparatus to open the control valve to permit water to be discharged from the water outlet to the water tank. When sufficient water has been discharged so that the oil/water interface returns to prescribed level of the sensing apparatus, the float member returns to an intermediate position which causes the linkage of the sensing apparatus to return the control valve to a closed position. As the control valve 38 always remains closed unless the water level rises above the prescribed level, in typical operation, it is not expected for the water level to fall below the prescribed level, however, should the water level be below the prescribed level, the float member merely acts in a direction to maintain the control valve 38 closed until the water level does rise again above the prescribed level as described above.

The hydrocarbon emulsion is introduced into the treatment tank through a production inlet 48. The production inlet again comprises a pipe flange communicating through the side wall of the treatment tank at an intermediate location which is spaced above the water outlet but spaced below the prescribed level of the sensing apparatus 40. More particularly, as shown in FIGS. 2 and 3, the production inlet 48 is spaced well below the oil outlet 34 and well below an interface between the oil section and the gas section within the treatment tank, so as to be in proximity to the level of the sensing apparatus 40 and to the interface between the oil section and the water section within the treatment tank. The pipe flange permits connection to a production line of fluids immediately produced at a production site, or connection to pumping equipment from a transport truck or other storage tank for example. The production inlet 48 is diametrically opposite from the water outlet, the oil outlet and the sensing apparatus which are all commonly located at an opposing side of the treatment tank.

Internally within the treatment chamber, the production inlet communicates with a flow splitter 50, which diverts the incoming flow into an upward pipe component 52 and a downward pipe component 54. The downward pipe component diverts a portion of the incoming fluid downwardly therefrom towards the hopper bottom.

A deflector 56 is supported above the upward component in the form of a generally horizontal deflector member spanning fully across an area of the upward component but at a location spaced thereabove such that the upwardly directed flow of incoming fluid from the upward pipe component is redirected by the deflector 56 so that substantially all upward flow is redirected in a plurality of lateral directions extending horizontally in all directions from the deflector.

To encourage the oil and water separation within the treatment tank, the oil section of the treatment chamber may be heated using conventional heating means. In one example a heat tube flange communicates through the side wall of the tank in proximity to but spaced above the prescribed level of the sensing apparatus so as to be immediately above the oil/water interface. The heat tube flange 58 is suitable for receiving a burner tube therethrough in sealing engagement with the side wall of the tank such that a burner externally of the tank can be used to heat the heat tube which in turn extends into the treatment chamber through the heat tube flange for heating the contents of the treatment tank.

Various treatment chemicals may also be added to the emulsion in the treatment tank by various means to assist in the oil and water separation.

A cleanout outlet 60 communicates through the external wall of the treatment tank at the hopper bottom immediately adjacent the bottom wall of the tank for discharging collected sand and sludge at the bottom of the tank therethrough. A plurality if wash nozzles 62 are fixedly mounted in the hopper bottom of the treatment tank with the nozzles being directed upwardly and radially outwardly in a conical pattern for flushing the conical perimeter wall of the hopper bottom when the wash fluid is directed into treatment tank through the wash nozzles.

Typically, a vacuum truck or other suitable equipment can be connected to the cleanout outlet simultaneously with wash fluid being pumped into the treatment tank through the wash nozzles for both stirring up the sand and sludge with wash fluid and removing the subsequently agitated sand and sludge through the cleanout outlet in one operation. Due to the low pressure environment of the treatment tank, a cleanout operation could optionally be performed during continued use of the treatment tank for separating oil and water in an emulsion simultaneously introduced into the treatment tank.

Each of the oil and water tanks comprises a single unit which is a single unit which is readily transported to a site and deposited at the site in a single operation. More particularly, each of the oil and water tanks includes a platform base supported on a skid for ready transport using a winch truck and the like. Containment walls extend upwardly from the platform base to define a secondary containment area 64. A horizontally elongated tank is integrally supported on the platform base together with the containment area 64 so that the tank and containment form a unitary assembly transported and deposited at a site.

The oil tank 14 receives the oil from the piping communicating between the oil outlet of the treatment tank and the oil tank adjacent the top end of the oil tank. The oil tank further includes a return outlet 66 communicating through one of the end walls adjacent the bottom end thereof. The return outlet is intended to communicate with the interior of the oil tank adjacent the bottom end thereof for collecting settled water at the bottom of the oil tank due to some entrained water potentially being carried from the treatment tank to the oil tank.

A first return line 68 communicates between the return outlet 66 and the production line feeding fluid into the treatment tank through the production inlet. A first return pump 70 is connected in series with the first return line to pump the returned fluid from the bottom of the oil tank to the production inlet of the treatment tank. The return pump may be operated periodically on an automated schedule or under manual actuation to periodically return fluid from the bottom of the oil tank to the treatment tank. Excess operation of the return pump 70 even when all water has been returned is not problematic as the oil is simply returned to the treatment tank to subsequently rise again into the oil section of the treatment tank for return by the oil outlet back to the oil tank with further opportunity for any entrained water to be separated therefrom.

Optionally a heater 72 may be also connected in series with the first return line 68 for heating the fluid returned to the separation process within the treatment tank as the additional heating of the fluid may further assist in separation of any entrained water therefrom.

The oil tank also includes a discharge outlet 74 also communicating through the end wall of the tank. A shut off valve is coupled in series with the discharge outlet for maintaining the discharge outlet closed until it is connected to a suitable tank, such as a transport truck for discharging the separated oil from the oil tank for transport to a separate processing site. The discharge outlet communicates with the interior of the oil tank at an intermediate level in proximity to but spaced above the bottom end of the tank.

The water tank 18 similarly receives water therein through an end wall of the tank at an intermediate height. A return outlet 76 is provided in the end wall of the water tank which in turn communicates with a second return line 78 in communication between the return outlet and the production line feeding the production inlet of the treatment tank. The second return line 78 is also connected in series with a second return pump 80 which serves to pump fluid under pressure from the water tank to the treatment tank.

Within the interior of the water tank, the return outlet 76 communicates with a flexible line 82 having an open inlet end within the interior of the treatment tank which is supported by a floating skimmer apparatus 84 arranged to be buoyantly supported above a water section in the water tank. In this manner, any oil entrained with the flow of water from the treatment tank through the water outlet to the water tank and which subsequently separates from the water within the water tank to form an oil section at the top end of the oil tank, will be drawn into the open end of the flex line 82 of the return outlet 76 to return the oil and water mixture to the production inlet of the treatment tank. Again, the return pump 80 can be operated automatically or manually at prescribed intervals, without concern for excess operation as any excess water returned to the treatment tank will simply be separated again into the water section and returned through the water outlet to the water tank. The water tank also includes a discharge outlet 86 with a corresponding shut off valve such that the discharge outlet remains closed until connected to a suitable external tank such as a transport truck. A discharge outlet 86 is located at an intermediate height which is near to, but spaced above the bottom end of the water tank.

Turning now to the second embodiment of FIGS. 4 through 8, the treatment system 10 in this instance again comprises a treatment tank 12, an oil tank 14 and a water tank 18; however, the oil tank 14 in this instance comprises a first oil tank 14A and a second oil tank assembly 14B in series with one another. Furthermore, all of the tanks in his instance comprise horizontally elongated tanks having a cylindrical wall extending horizontally between two opposed vertical end walls.

The system 10 in this instance further includes a gas separator 90 connected in series with the production inlet 48 of the treatment tank so as to remove some gas from the emulsion prior to the emulsion. The gas separator comprises a tank having an inlet for receiving the emulsion, a gas outlet through which gas is removed from the tank, and an oil outlet through which the degassed oil emulsion is removed from the tank for subsequent communication with the production inlet of the treatment tank. The tank further includes a series of baffles through which the production flow must pass to assist in separating the gas from the emulsion. The gas outlet is configured to operate the gas separator tank substantially at atmospheric pressure.

According to the second embodiment, the treatment tank 12 and the first oil tank 14A are supported on a common main frame 100 which includes a secondary containment structure 102 which is integrally supported on the common frame so as to be portable together with the tanks thereon as a single unit which can be loaded and transported by a conventional winch truck. The secondary containment structure spans below the two tanks and has a secondary storage volume which exceeds the largest of the two tanks supported thereon.

The common frame further supports an enclosure 104 thereon within the perimeter boundary of the secondary containment structure therebelow. The first oil tank 14A and the treatment tank 12 are mounted longitudinally in series with one another with the enclosure 104 being provided at the outer end of the treatment tank.

In the second embodiment, the treatment tank is again provided with a gas vent 32 communicating through the top wall. The oil outlet 34 in this instance comprises a riser 106 supported internally within the treatment tank having an open top end in proximity to the top end of the treatment tank so as to be near the top but spaced slightly therebelow. Accordingly, the gas section of the treatment tank is again defined between the top end of the tank and the open top end of the riser 106 so that any oil rising from the oil section will fall into the riser and be communicated out of the oil outlet 34 into the first oil tank 34 which is supported together on the common frame 100 with the treatment tank 12 but at a lower elevation. The flow of oil from the treatment tank to the first oil tank 14A is again accomplished by open communication at atmospheric pressure solely under force of gravity. This is accomplished by supporting the treatment tank spaced above the secondary containment structure of the common frame by a plurality of elevated supports or stilts extending vertically between the secondary containment structure and the treatment tank spaced thereabove.

Similarly to the previous embodiment, the treatment tank 12 according to the second embodiment again includes a water outlet 36 in communication through one of the end walls of the tank in proximity to the bottom end thereof for discharging water from the water section of the treatment tank therethrough. Again, a control valve 38 is coupled in series with the water outlet and is controlled by use of a sensing apparatus 40 including a float member 42 supported internally within the treatment tank at the interface between the oil and water sections. The water outlet 36 and the sensing apparatus controlling the control valve 38 are all located within the enclosure 104 at one end of the treatment tank by communicating through the corresponding end wall of the treatment tank.

A production inlet 48 of the treatment tank according to the second embodiment may also communicate through the end wall surrounded by the enclosure 104, or through the side wall of the tank, with the optional use of a flow splitter as described above with regard to the first embodiment.

The treatment tank may also be provided with a cleanout outlet in communication through the outer end wall in proximity to the bottom end thereof for use with a plurality of wash nozzles also located internally at the bottom end of the tank similarly to the outlet 60 and nozzles 62 of the first embodiment. Although no hopper section is provided in the second embodiment similar to the conical wall 24 of the vertical tank of FIG. 2, the horizontally oriented cylindrical side wall of the treatment tank according to the second embodiment again tapers downwardly and inwardly to assist in gathering sludge at a central location at the bottom of the treatment tank for discharge through the cleanout outlet.

The second oil tank assembly 14B in this instance comprises two cylindrical tanks mounted in series with one another on a common frame with a secondary containment structure 64 spanning therebelow as a single portable unit similarly to the treatment tank and oil tank combination. An auxiliary oil line 108 communicates openly from the first oil tank 14A to one of the second oil tanks 14B with the two second oil tanks openly communicating with one another with a suitable communication passage connected therebetween. The other second oil tank 14B locates the return outlet 66 therein from which the first return line 68 communicates back to the treatment tank when operating the first return pump 70. The second one of the second oil tanks 14B also locates a discharge outlet 74 thereon to permit clean oil to be discharged to a tanker truck for example.

A water tank unit 18 is provided which is substantially identical to the second oil tank assembly 14B supporting the two second oil tanks thereon by providing two water tanks on a common frame with a secondary containment structure 64 spanning below both tanks. The water tank unit including both water tanks and the secondary containment structure thus are portable together as a single unit using a winch truck. The first one of the water tanks receives water discharged from the water outlet 36 of the treatment tank therein. The two tanks are in open communication with one another by a suitable passageway. The return outlet 76 communicates with the second water tank for discharging oil or oil and water mixture from the return outlet 76 through the second return line 78 back to the treatment tank under action of the second return pump 80. Similar to the previous embodiment, a flex line 82 with a skimmer 84 are provided within the interior of the water tank for skimming oil off the top of the collected water to primarily return oil back to the treatment tank. A discharge outlet 86 is also provided for discharging substantially clean water to a tanker truck as desired.

The first return pump 70 and the second return pump 80 can be located within the enclosure 104 so that most of the operating components can be protected from the elements within the heated enclosure 104 and thereby protect the operating components from freezing in colder climates.

Referring now to FIGS. 9 through 14, the main frame 100 supporting the treatment tank thereon according to the second embodiment of FIGS. 4 through 14 will now be described in further detail.

The main frame 100 is elongate in a longitudinal direction between two opposed ends 202. The frame includes two skid beams 204 which are parallel and laterally spaced apart to extend substantially the full length in the longitudinal direction between the opposed ends 202 at the bottom side of the common frame. The beams 204 are of the type particularly suited for loading onto a suitable winch truck for example.

The secondary containment structure 102 supported on the top side of the skid beams includes a flat bottom wall 206 which is generally rectangular and spans horizontally along the top side of the two skid beams substantially the full length between the opposed ends 202. A set of perimeter walls extend vertically upwardly from the perimeter edge of the flat bottom wall 206 about the full circumference thereof including two end walls 208 and two side walls 210 extending in the longitudinal direction between the end walls 208 at the opposed ends 202. All of the walls extend upwardly from the floor to a common height defining the upper boundary of the containment volume of the secondary containment 102.

A series of tank cradles 212 are mounted on the flat bottom wall towards one end of the common frame for supporting the first oil tank 14A thereon substantially against the floor. The second oil tank is a cylindrical tank oriented in a horizontal direction to be elongate in a longitudinal direction of the common frame while spanning less than half the length of the common frame. The outermost end of the first oil tank 14A is faced inwardly from the corresponding end wall 208 of the secondary containment area to provide for access for a burner tube for heating, and various inlet and outlet flanges for communication with the contents of the first oil tank such that all of the pipe coupling flanges and the connection to a burner tube reside within the longitudinal boundary of the end wall 208 of the secondary containment area.

The secondary containment 102 also integrally locates a support frame 214 therein which is fixed relative to the main frame 100 and which supports the treatment tank 12 thereon such that the treatment tank is similarly oriented to be elongate in the longitudinal direction of the common frame but at a location which is spaced upwardly from the bottom wall 206 so as to be greater in elevation than the first oil tank 14A.

The treatment tank also comprises a cylindrical tank which is horizontally oriented while being supported at an elevation such that the bottom side of the treatment tank is spaced above the flat bottom wall 206 of the containment, as well as being spaced well above the top end of the containment walls such that the treatment tank is supported fully spaced above the containment volume of the secondary containment area 102 to maximize the containment volume thereof. The bottom side of the treatment tank remains spaced below the top side of the first oil tank 14A but is closer to the top side than the bottom side of the first oil tank.

Length of the treatment tank in the longitudinal direction is similar to the first oil tank 14A so as to span less than half the overall length of the common frame 100. In this manner, the treatment tank can be supported longitudinally in series with the first oil tank 14A while still permitting some longitudinal space between the outer most end of the treatment tank and the corresponding end wall 208 of the containment area such that a suitable enclosure 104 can be mounted about the outermost end of the treatment tank while still being longitudinally and laterally contained within the boundary walls of the secondary containment 102.

The enclosure 104 and the treatment tank are commonly supported on a suitable tank frame 216 which is in turn supported on the support frame 214 of the main frame 100 such that it can be readily removed for transport. In this manner, the treatment tank and the enclosure can be removed together by being commonly mounted on the tank frame 216 for separation from the remainder of the main common frame 100 which supports the secondary containment 102, the first oil tank 14A, and the support frame 14 fixedly and integrally thereon.

The support frame 214 comprises a plurality of longitudinally spaced apart frame assemblies 218. Each frame assembly comprises two laterally spaced apart legs 220 extending vertically upward from the flat bottom wall 206 of the containment 102 to respective top ends situated at a common horizontal elevation spaced above the bottom wall. Each frame assembly 218 further comprises a cross beam 222 extending horizontally and laterally between the top ends of the two legs 220 of the corresponding frame assembly. The cross beam 222 defines an upper support surface upon which the tank frame 216 is supported in a mounted position onto the main common frame 100.

Two of the longitudinally opposed ones of the frame assemblies include additional guide plates 224 extending vertically upward from opposing ends of the cross beam such that the guide plates are parallel with the longitudinal direction and vertically oriented at laterally spaced positions. The guide plates 224 protrude upwardly from the upper support surface of the cross beams so as to receive the tank frame 216 therebetween in close fitting relationship when the tank frame is lowered into a mounted position resting on the upper supporting surface of the cross beams. The four guide plates 224 are thus located approximately at the four corners of a rectangular supporting area which receives the rectangular tank frame 216 therein. The guide plates 224 together with the cross beams 222 of the support frame collectively define a cradle into which the tank frame can be lowered to laterally position the tank frame relative to the support frame.

The tank frame 216 of the treatment tank comprises two rails 226 which are parallel and spaced apart to extend in the longitudinal direction along the bottom side of the tank frame. A series of tank cradles 228 are mounted on the top side of the rails 226 to support the tank on the rails. The two rails span the full length of the tank frame and define the width of the tank frame such that the outer dimension between the two rails fits closely within the inner lateral dimension between respective laterally opposed pairs of the side plates 224 to laterally locate the tank frame relative to the support frame.

To provide longitudinal alignment between the tank frame and the support frame, the tank frame is provided with a laterally protruding alignment pin 230 which is fixed onto and protrudes laterally outward from one of the rails 226 in alignment with the corresponding one of the guide plates 224. The corresponding guide plate 224 in this instance includes an alignment slot 232 extending downwardly from the top edge thereof with a generally V-shaped profile tapering downwardly and inwardly to a central apex of suitable dimension to closely receive the alignment pin 230 therein. The opposing edges of the slot thus diverge from one another in an upward direction from the bottom end dimensioned to closely receive the pin therein to a top end which is much wider in dimension than the pin to assist in entry and alignment of the pin with the apex of the slot as the tank frame is lowered downwardly onto the support frame 214.

By enabling the tank frame to be removed from the support frame, the overall height of the main frame 100 supporting the treatment tank and the first oil tank 14A thereon can be reduced for transport. Upon delivery to a working location, the main common frame 100 is unloaded from the winch truck using the skid beams 204, followed by a crane which lifts the tank frame 216 with the treatment tank and enclosure 104 supported thereon from a separate transport vehicle downwardly onto the support frame 214. The guide plates and the alignment pin serve to align the tank frame longitudinally and laterally relative to the main common frame 100.

The enclosure 104 is a suitable sized building to receive an operator therein in addition to locating the appropriate return pumps and various valve controls and pipe connections as described above. Access to the enclosure by an operator can be provided by an external staircase which is separately mounted at the outermost end of the main frame 100, longitudinally beyond the corresponding end wall boundary of the secondary containment area 102.

To add to the safety of the containment, one or more overflow flanges 234 are mounted about the perimeter of the walls of the containment 102. Each overflow flange comprises a pipe collar communicating through the containment wall at a location in proximity to the top end of the wall. A suitable bolt flange is situated at the outer end of the collar externally of the containment area. A sealing plate can be bolted across the open end of the overflow flange when not in use. When desired for use to provide additional containment volume, suitable piping can be bolted in connection between the overflow flange 234 of the secondary containment 102 of one unit to the corresponding overflow flange of the secondary containment of an adjacent unit, for example the secondary containment of the water tank or the secondary oil tank 14B. In this manner, if one of the containment areas were to approach being full, prior to overflowing over the top of the walls, the contained fluid would instead flow through the overflow flange 234 into the adjacent containment volume to which it is connected.

According to either embodiment, the system 10 described herein provides a simple and effective treatment system for treating a produced hydrocarbon emulsion, particularly light oil. The produced emulsion can be received directly from a production line on site or can receive produced fluids pumped from storage tanks and transport trucks through the production inlet thereof. As the fluid enters the treatment tank and is split into multiple directions within the water section, the lighter oil sections float above the water section into the oil section, while gases rise to the top end of the tank at the gas section where gas is vented externally to maintain pressure within the treatment tank near atmospheric pressure.

As a continued flow of produced fluids enters the treatment tank, the separated oil rising to the top of the tank overflows into the oil outlet for automatic transfer under force of gravity discharge only to the oil tank.

As water accumulates at the bottom of the tank in the water section, the sensing apparatus and control valve ensure that the oil/water interface is maintained substantially at the central prescribed level of the sensing apparatus by opening the control valve and discharging water to the water tank as required.

The return pumps are operated as required using automated sensors, manual techniques, or on an automated schedule to return water collected in the oil tank or oil collected in the water tank back to the treatment tank.

Additional heating of fluids in the return lines or using a burner tube in the oil section together with treatment chemicals are used as required to assist in the oil and water separation process within the treatment tank.

The wash nozzles and cleanout discharge can also be operated using cleanout equipment at periodic intervals to clean out sand and sludge collected in the hopper section. The hopper section assists in concentrating the sand and sludge to a central location.

As described herein the produced emulsion and recycled fluids enter through the production inlet of the treatment tank. The deflector prevents tank turbulence to permit water to fall to the bottom, oil to rise to the top and sludge to settle within the hopper bottom. The fluid level is controlled using a weighted dump float which forms the sensing apparatus 40 to control water level dumping to the water tank. Oil transferred to the oil tank is accomplished by spill over at the oil outlet. Gas is vented through the gas vent at the top of the tank through to a flare or scrubber equipment as required.

The first recycle pump operates to return fluid from the bottom of the oil tank while the second recycle pump returns skimmed fluids from the top of the water tank to ensure that suitable separated and clean water can be disposed or trucked from the water tank while suitable sales oil can be pumped or trucked from the oil tank.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A treatment system for use with a water tank and an oil tank for treating a produced hydrocarbon emulsion, the treatment system comprising:
   a treatment tank comprising:
      a treatment chamber;
      a production inlet in communication with the treatment chamber so as to be arranged to introduce the produced hydrocarbon emulsion into the treatment chamber;
      a water outlet in communication with the treatment chamber in proximity to a bottom end of the treatment chamber so as to be arranged to discharge water from the bottom end of the treatment chamber therethrough;
      a gas vent in communication with the treatment chamber in proximity to a top end of the treatment chamber so as to be arranged to vent gases from the treatment chamber therethrough and maintain the treatment chamber near atmospheric pressure;
      an oil outlet in communication with the treatment chamber in proximity to the top end of the treatment chamber, at a location spaced below the gas vent so as to define a gas section at the top end of the treatment chamber between the gas vent and the oil outlet, the oil outlet being arranged to discharge oil from treatment chamber therethrough; and
      a control valve connected in series with the water outlet of the treatment tank and a sensing apparatus arranged to sense upward deviation of an interface between an oil section and a water section in the treatment chamber from a prescribed operating level, the control valve being operable to only permit discharging of the water through the water outlet responsive to said upward deviation of the interface above the prescribed operating level;
   the water outlet of the treatment tank being arranged to communicate with the water tank such that the water tank is arranged to receive the water discharged from the treatment chamber;
   the oil outlet of the treatment tank being arranged to communicate with the oil tank such that the oil tank is arranged to receive the oil discharged from the treatment chamber; and
   the production inlet communicating with the treatment chamber at a location spaced below the oil outlet so as to be in proximity to said prescribed operating level of the interface between the oil section and the water section.

2. The system according to claim 1 wherein the treatment tank is situated at a greater elevation than the water tank and the oil tank.

3. The system according to claim 1 wherein the oil outlet of the treatment tank communicates with the oil tank through an open passageway so as to be arranged to communicate oil therethrough by gravity discharge.

4. The system according to claim 1 wherein the production inlet communicates with the treatment chamber at a location spaced below said prescribed operating level of the interface between the oil section and the water section.

5. A treatment system for use with a water tank and an oil tank for treating a produced hydrocarbon emulsion, the treatment system comprising:
   a treatment tank comprising:
      a treatment chamber;
      a production inlet in communication with the treatment chamber so as to be arranged to introduce the produced hydrocarbon emulsion into the treatment chamber,
      a water outlet in communication with the treatment chamber in proximity to a bottom end of the treatment chamber so as to be arranged to discharge water from the bottom end of the treatment chamber therethrough, the water outlet being arranged to communicate with the water tank such that the water tank is arranged to receive the water discharged from the treatment chamber;
      a gas vent in communication with the treatment chamber in proximity to a top end of the treatment chamber so as to be arranged to vent gases from the treatment chamber therethrough and maintain the treatment chamber near atmospheric pressure;
      an oil outlet in communication with the treatment chamber in proximity to the top end of the treatment chamber, at a location spaced below the gas vent so as to define a gas section at the top end of the treatment chamber between the gas vent and the oil outlet, the oil outlet being arranged to discharge oil from treatment chamber therethrough, the oil outlet being arranged to communicate with the oil tank such that the oil tank is arranged to receive the oil discharged from the treatment chamber; and
      a flow splitter in communication with the production inlet which is arranged to direct the produced hydrocarbon emulsion into the treatment chamber in more than one direction.

6. A treatment system for use with a water tank and an oil tank for treating a produced hydrocarbon emulsion, the treatment system comprising:
   a treatment tank comprising:
      a treatment chamber;
      a production inlet in communication with the treatment chamber so as to be arranged to introduce the produced hydrocarbon emulsion into the treatment chamber;
      a water outlet in communication with the treatment chamber in proximity to a bottom end of the treatment chamber so as to be arranged to discharge water from the bottom end of the treatment chamber therethrough, the water outlet being arranged to communicate with the water tank such that the water tank is arranged to receive the water discharged from the treatment chamber;
      a gas vent in communication with the treatment chamber in proximity to a top end of the treatment chamber so as to be arranged to vent gases from the treatment chamber therethrough and maintain the treatment chamber near atmospheric pressure;
      an oil outlet in communication with the treatment chamber in proximity to the top end of the treatment chamber, at a location spaced below the gas vent so as to define a gas section at the top end of the treatment chamber between the gas vent and the oil outlet, the oil outlet being arranged to discharge oil from treatment chamber therethrough, the oil outlet being arranged to communicate with the oil tank such that the oil tank is arranged to receive the oil discharged from the treatment chamber;

a return line in communication with the water tank and the treatment chamber of the treatment tank so as to be arranged to return oil in the water tank to the treatment chamber; and a return pump in series with the return line so as to be arranged to pump the oil returned to the treatment chamber.

7. The system according to claim 6 wherein the return line communicates with an interior of the water tank using an inlet tube supported at an open end by a float member arranged to float above a water layer in the water tank.

8. A treatment system for use with a water tank and an oil tank for treating a produced hydrocarbon emulsion, the treatment system comprising:

a treatment tank comprising:

a treatment chamber;

a production inlet in communication with the treatment chamber so as to be arranged to introduce the produced hydrocarbon emulsion into the treatment chamber;

a water outlet in communication with the treatment chamber in proximity to a bottom end of the treatment chamber so as to be arranged to discharge water from the bottom end of the treatment chamber therethrough, the water outlet being arranged to communicate with the water tank such that the water tank is arranged to receive the water discharged from the treatment chamber;

a gas vent in communication with the treatment chamber in proximity to a top end of the treatment chamber so as to be arranged to vent gases from the treatment chamber therethrough and maintain the treatment chamber near atmospheric pressure;

an oil outlet in communication with the treatment chamber in proximity to the top end of the treatment chamber, at a location spaced below the gas vent so as to define a gas section at the top end of the treatment chamber between the gas vent and the oil outlet, the oil outlet being arranged to discharge oil from treatment chamber therethrough, the oil outlet being arranged to communicate with the oil tank such that the oil tank is arranged to receive the oil discharged from the treatment chamber;

a return line in communication with the oil tank and the treatment chamber of the treatment tank so as to be arranged to return water in the oil tank to the treatment chamber; and a return pump in series with the return line so as to be arranged to pump the water returned to the treatment chamber.

9. The system according to claim 8 further comprising a heater arranged to heat the return line so as to be arranged to return heated fluid to the treatment tank.

10. A treatment system for use with a water tank and an oil tank for treating a produced hydrocarbon emulsion, the treatment system comprising:

a treatment tank comprising:

a treatment chamber;

a production inlet in communication with the treatment chamber so as to be arranged to introduce the produced hydrocarbon emulsion into the treatment chamber;

a water outlet in communication with the treatment chamber in proximity to a bottom end of the treatment chamber so as to be arranged to discharge water from the bottom end of the treatment chamber therethrough, the water outlet being arranged to communicate with the water tank such that the water tank is arranged to receive the water discharged from the treatment chamber;

a gas vent in communication with the treatment chamber in proximity to a top end of the treatment chamber so as to be arranged to vent gases from the treatment chamber therethrough and maintain the treatment chamber near atmospheric pressure;

an oil outlet in communication with the treatment chamber in proximity to the top end of the treatment chamber, at a location spaced below the gas vent so as to define a gas section at the top end of the treatment chamber between the gas vent and the oil outlet, the oil outlet being arranged to discharge oil from treatment chamber therethrough, the oil outlet being arranged to communicate with the oil tank such that the oil tank is arranged to receive the oil discharged from the treatment chamber; and a bottom wall which tapers downwardly and inwardly from a peripheral wall of the treatment tank to a bottom discharge opening through which sludge is arranged to be discharged so as to define a tapered section at a bottom end of the treatment tank arranged to collect sludge towards the bottom discharge opening.

11. The system according to claim 10 further comprising a plurality of clean out nozzles supported in the tapered section at the bottom end of the treatment tank.

12. A treatment system for use with a water tank and an oil tank for treating a produced hydrocarbon emulsion, the treatment system comprising:

a treatment tank comprising:

a treatment chamber;

a production inlet in communication with the treatment chamber so as to be arranged to introduce the produced hydrocarbon emulsion into the treatment chamber;

a water outlet in communication with the treatment chamber in proximity to a bottom end of the treatment chamber so as to be arranged to discharge water from the bottom end of the treatment chamber therethrough, the water outlet being arranged to communicate with the water tank such that the water tank is arranged to receive the water discharged from the treatment chamber;

a gas vent in communication with the treatment chamber in proximity to a top end of the treatment chamber so as to be arranged to vent gases from the treatment chamber therethrough and maintain the treatment chamber near atmospheric pressure; and an oil outlet in communication with the treatment chamber in proximity to the top end of the treatment chamber, at a location spaced below the gas vent so as to define a gas section at the top end of the treatment chamber between the gas vent and the oil outlet, the oil outlet being arranged to discharge oil from treatment chamber therethrough, the oil outlet being arranged to communicate with the oil tank such that the oil tank is arranged to receive the oil discharged from the treatment chamber;

wherein the treatment tank and the oil tank are supported on a common frame including an integral secondary containment structure supported on the common frame below the treatment tank and the oil tank.

13. The system according to claim 12 wherein the treatment tank is supported on the common frame at a greater elevation than the oil tank.

14. The system according to claim 12 further comprising an overflow port communicating through a perimeter wall of the secondary containment structure in proximity to a top end of the secondary containment structure and a pipe connecting flange supported on the overflow port so as to be arranged for connection to the overflow port of an adjacent containment structure of identical configuration.

15. The system according to claim 12 wherein the treatment tank is supported spaced above an upper boundary of the secondary containment structure.

16. The system according to claim 12 wherein the common frame integrally supports the secondary containment structure, the oil tank and a support frame thereon, the support frame defining a cradle structure supporting the treatment tank therein such that the treatment tank is readily separable from the support frame.

17. The system according to claim 12 further comprising:
an enclosure supported on the common frame so as to surround the water outlet;
an oil return pump received within the enclosure and operably connected to return oil from the water tank to the treatment chamber; and
a water return pump received within the enclosure and operably connected to return water from the oil tank to the treatment chamber.

18. The system according to claim 1 in combination with a gas separator connected in series with the production inlet of the treatment tank having a gas outlet configured to operate the treatment tank substantially at atmospheric pressure.

\* \* \* \* \*